US007401234B2

(12) United States Patent
Case et al.

(10) Patent No.: US 7,401,234 B2
(45) Date of Patent: Jul. 15, 2008

(54) AUTONOMOUS MEMORY CHECKER FOR RUNTIME SECURITY ASSURANCE AND METHOD THEREFORE

(75) Inventors: Lawrence L. Case, Phoenix, AZ (US); Mark D. Redman, Gilbert, AZ (US); Thomas E. Tkacik, Phoenix, AZ (US); Joel D. Feldman, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 866 days.

(21) Appl. No.: 10/791,171

(22) Filed: Mar. 1, 2004

(65) Prior Publication Data

US 2005/0193217 A1    Sep. 1, 2005

(51) Int. Cl.
*G06F 11/30* (2006.01)

(52) U.S. Cl. ............... 713/193; 713/153; 711/100; 711/170; 711/137; 707/9; 717/151

(58) Field of Classification Search ............ 726/22, 726/2; 713/153, 193, 165, 168; 711/100, 711/170, 137; 710/22, 308; 707/9; 717/151
See application file for complete search history.

(56) References Cited

U.S. PATENT DOCUMENTS

| | | | |
|---|---|---|---|
| 6,009,527 A * | 12/1999 | Traw et al. | 726/15 |
| 6,098,171 A | 8/2000 | Johnson et al. | |
| 6,148,083 A | 11/2000 | Fieres et al. | |
| 6,587,947 B1 | 7/2003 | O'Donnell et al. | |
| 6,701,432 B1 * | 3/2004 | Deng et al. | 713/153 |
| 6,848,061 B2 * | 1/2005 | Kawase | 713/600 |
| 2003/0014639 A1 | 1/2003 | Jackson et al. | |
| 2003/0055552 A1 | 3/2003 | Akins et al. | |

FOREIGN PATENT DOCUMENTS

CN    1155700 A    7/1997
JP    10-326126    8/1998

OTHER PUBLICATIONS

International Search Report.

* cited by examiner

*Primary Examiner*—Thanhnga B Truong
(74) *Attorney, Agent, or Firm*—Ingrassia, Fisher & Lorenz, P.C.

(57) ABSTRACT

Methods and apparatus are provided for an electronic device having an autonomous memory checker for runtime security assurance. The autonomous memory checker comprises a controller, a memory reference file coupled to the controller, and an authentication engine coupled to the controller. A check is performed during runtime operation of the electronic device. The autonomous memory checker generates runtime reference values corresponding to trusted information stored in memory. The runtime reference values are compared against memory reference values stored in the memory reference file. The memory reference values are generated from the trusted information stored in memory. An error signal is generated when the runtime reference values are not identical to the memory reference values thereby indicating that the trusted information has been modified.

20 Claims, 4 Drawing Sheets

AUTONOMOUS MEMORY CHECKER FOR RUNTIME SECURITY ASSURANCE AND METHOD THEREFORE

TECHNICAL FIELD OF THE INVENTION

The present invention generally relates to security assurance of software, and more particularly relates to a hardware method for adding security assurance to runtime software.

BACKGROUND OF THE INVENTION

Assuring code integrity of embedded systems software at runtime is becoming a significant security issue for an embedded electronic device. An example of high volume electronic devices where it is beneficial to ensure the integrity of the software stored in memory are personal digital assistants (PDAs) and cell phones. In general, these devices use internal microprocessors to execute instructions in two stages: boot-time and runtime. A trusted computer system uses cryptographic software to authenticate each stage prior to its execution.

During boot-time, an embedded processor executes fundamental hardware and software initialization instructions (the boot code) stored in non-volatile memory such as electrically erasable read only memory (such as a flash non-volatile memory), read only memory (ROM), or electrically programmable read only memory (EPROM). The purpose of the boot code is to validate and configure the hardware and hardware related data in order to present a known execution environment and user interface for the system software. For trusted computer operation, the boot code also validates or authenticates the program application and operating system (OS) memory at boot-time to ensure that it contains the code that is expected and hence trusted. Once the boot-time instruction has checked for authenticity, the system control is passed to the validated OS/application execution image and enters the runtime mode.

During runtime, the processor executes code out of the OS/application image. The OS will typically establish a multi-process runtime execution environment and load any start-up or embedded applications in preparation for normal runtime processes. It is during this later time, when the runtime environment is fully established, that it is possible for untrusted user application code or downloaded dynamic code to be run and for memory corruption to occur on the original trusted and authenticated code, due to non-boot-time factors such as computer viruses or internal programming bugs. Furthermore, the OS/application program memory validated at boot-time could maliciously be replaced by a runtime memory, which is completely different from what is authenticated at boot-time. This is known as a "piggy back" attack, which poses a considerable security threat to embedded system software. Requiring physical access to the product platform, a runtime memory device is piggy-backed over the original validated memory device. It completely replaces the validated boot device after the boot process finishes and passes control to the external memory, hence creating a completely different, unchecked runtime environment.

Conventional methods of validating instruction codes in systems software only authenticate the instruction memory once. One-time validation is performed either by generating a one-way memory reference signature or asymmetric key digital signature using a cryptographic algorithm. Prior to execution, a message authentication code or a similar digital signature is generated on the instruction memory. If the generated result matches a pre-determined value stored elsewhere in the system or within the encrypted asymmetric digital signature, the instructions are permitted to execute. However, current solutions do not address the risk of tampering with the instruction memory contents after the initial authentication. During runtime, instruction codes are vulnerable to piggy-back or software attacks which will replace the authenticated instruction memory or data. Integrity of initially authenticated codes can be compromised by physical replacement of memory or diversion of processor to execute code from a memory range that was not originally authenticated. For example, a computer virus can remain dormant during boot-time and then cause an exception in the processor to make it execute a different set of instructions.

A large portion of the system software controlling an electronic device should not change during the course of operation of the device. Even though the system software is loaded into memory with high assurance by initial authentication, the probability of system degradation goes up after several million clock cycles and continued exposure to un-trusted code. If the system is corrupted, it cannot be trusted to perform self-check functions. In fact, the reference data/memory that is used to make these self-checks are security targets or vulnerabilities and examples of data that is security sensitive and should never change. Other security sensitive data could be configuration registers, which control internal data visibility external to an embedded device or OS sensitive data such as (interrupt service routine (ISR) addresses or specific memory management unit (MMU) page tables or specific file system data such as user and group identifiers and passwords.

Furthermore, many embedded systems such as cell phones and PDA's enter the boot mode only if they are disconnected from power sources. Therefore, the integrity of original instruction codes of an embedded device in the runtime mode confronts a gradually increasing risk as the device runs downloaded application programs and communicates with external devices. The magnitude of this risk is therefore especially significant in devices that do not normally get disconnected from their power sources and that do not reboot to authenticate until power failures occur. Moreover, operating systems and application software are stored in different regions of memory. The fact that the software is stored in different regions and the software may be received from a number of sources, some reputable, others that cannot be substantiated poses a long term tracking and security problem.

Accordingly, it is desirable to devise a memory checker for runtime security assurance of software that is loaded to memory during the boot-time. It would be of benefit if the memory checker was autonomous to ensure checks occur. It would be of further benefit if the device was energy efficient and did not significantly impact runtime system performance by requiring frequent bus accesses.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
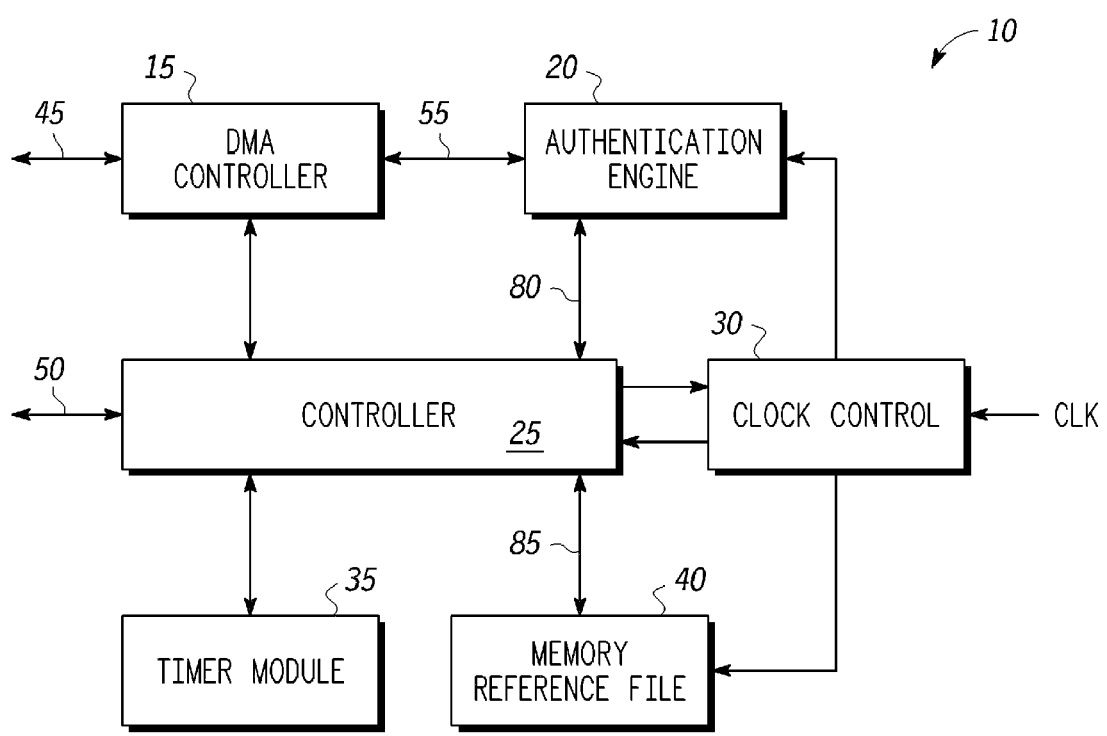
FIG. 1 is a block diagram of an autonomous memory checker in accordance with one embodiment of the present invention.

FIG. 1 is a block diagram of an autonomous memory checker 10 in accordance with one embodiment of the present invention. A host processor (not shown) first sets programmable parameters such as memory start addresses, lengths, direct memory access (DMA) read frequency, maximum burst size, and memory block enables. The host then sends a command via host bus 50 to a controller 25 of autonomous memory checker 10 to start an initial memory reference mode. In the initial memory reference mode, controller 25 requests a DMA controller 15 to fetch the memory contents via a DMA master bus 45. The memory content is trusted information. An authentication engine 20 receives the memory contents via an internal bus 55 and generates appropriate memory references. The authentication engine 20 can generate memory reference values such as hash functions for large blocks of data, a simple copy for small amounts of data, or cyclic redundancy check (CRC) for fast processing of large amounts of data. The memory reference values output from the authentication engine 20 are then stored in a memory reference file 40 via internal buses 80 and 85. Memory reference file 40 stores the memory reference values in memory during the boot-time mode. These memory reference values are repeatedly compared against runtime reference values generated during a runtime mode to ensure the integrity of the trusted information, which should not have changed since the boot-time mode.

An example of trusted information is software critical to the operation of an electronic device. The manufacturer loads the software in the electronic device. The software is trusted information since the manufacturer or other trusted entity has provided the software to the electronic device. In general, prior art electronic devices only check the integrity of the trusted information during boot-time mode. The trusted information is prone or susceptible to modification without the knowledge of the user of the electronic device. Modification of the trusted information by an outside agency without the knowledge of the user could have severe consequences. Checking the trusted information using a software program is self defeating because it is the integrity of the information in memory that is at question. In other words, the software checking program could be modified similar to the trusted information. It should be noted that the trusted information can be any type of information that should not be changed or modified and is not limited to software.

During runtime, autonomous memory checker 10 can proactively monitor the authenticity of validated memory contents. It can fetch values from memory and perform a variety of monitoring schemes. One possible method is "point checks," which retrieves data from one isolated location of the memory. Another method involves "wandering checks," which reads a value from a location and compares it with the previously stored value. If the two values match, the pointer is incremented and a new value is read and stored. This stored value is later compared with a value reread from the same memory location. The wandering checks repeat themselves within the boundaries of the allocated space.

Another common scheme is "block checks." This method is often called "hashing" or CRC. Block checks perform a compression-type function on a specified block of data and store a distinct representative value (i.e. output of a discrete mathematical function) for later comparison.

Other monitoring functions include write-read checks, active wait-for checks, and software to hardware handoff checks. The write-read checks load a random value into a memory location and then retrieve it later. Any change in the stored value indicates possible data corruption. The write-read method requires DMA controller 15 to be capable of both reading and writing to desired memory locations.

The active wait-for checks require the system software to "check-in" periodically for comparison. Lastly, the software to hardware handoff checks prevent buffer overflow attacks which occur in a subroutine where the space allocated for a buffer is smaller than the number of words written into it. The overflowing words fall into the stack space allocated for critical data such as program counter. When the subroutine returns, the program counter will be incorrect. One way to protect against the buffer overflow attack is to command healthy software to initiate a hardware check in a secure state. The healthy software informs the hardware that it is about to allocate a buffer in a subroutine and that location of the critical data is at a particular address. The hardware caches the critical values. Shortly after, the hardware looks to see if the value at the edge of the buffer did not change. Although the software to hardware handoff checks involve some overhead, it significantly adds security assurance to highly sensitive data.

Autonomous memory checker 10 stops its operation and asserts an appropriate interrupt to signal potential degradation of validated memory contents if a reference mismatch occurs, address/length error, or watchdog time-out occurs during runtime. It should be noted that autonomous memory checker 10 operates independently and cannot be deactivated by other logic blocks or programs during its operation. This ensures that trusted information will always be checked during runtime mode. Any error that occurs during runtime will cause the autonomous memory checker 10 to halt and signal an error to the host. In an embodiment of the system, a hardware reset is required to exit the error state.

Autonomous memory checker 10 also includes a timer module 35 and a clock control 30. Timer module 35 deactivates certain logic blocks of autonomous memory checker 10 in various stages of its operation to provide energy savings. Timer module 35 is on continuously and in part, controls the operation of clock control 30, controller 25, authentication engine 20, and other blocks. Timer module 35 contains a bus watchdog timer that ensures that DMA controller 15 is granted bus access within an acceptable amount of time. Clock control 30 provides clock signals to controller 25, authentication engine 20, and memory reference file 40 if clock control 30 is in an active mode.

DMA controller 15 allows the autonomous memory checker 10 to be a bus master. Autonomous memory checker 10 can fetch contents of the memory without requesting permission to the host at any time. DMA controller 15 has read capability. The direct memory access capability of DMA controller 15 allows autonomous memory checker 10 to be reliable in the event that the host processor cannot be trusted due to software corruption.

Figure 2:
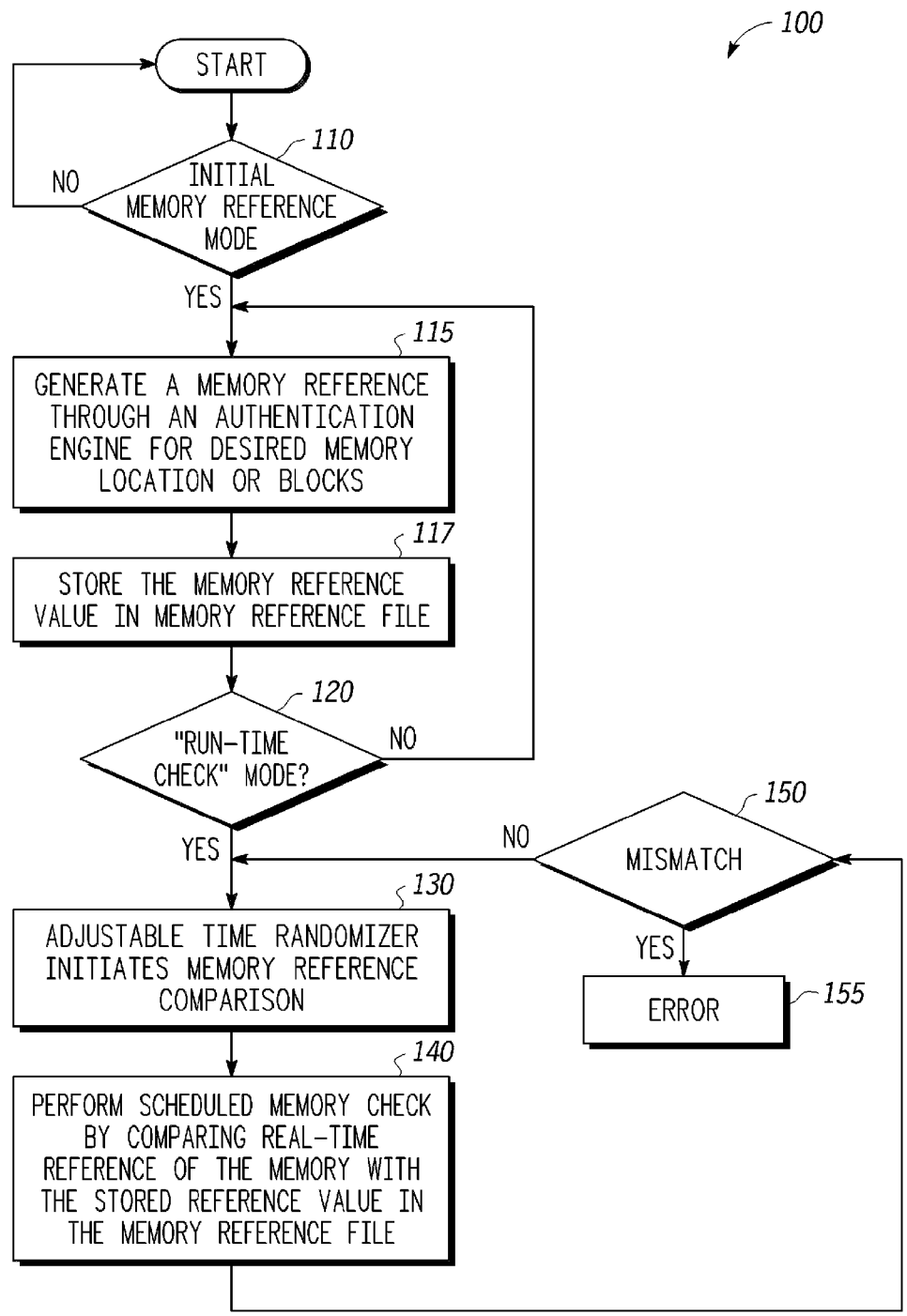
FIG. 2 is a first flow chart illustrating operating steps of an autonomous memory checker for runtime security assurance in accordance with one embodiment of the present invention.

FIG. 2 is a first flow chart 100 demonstrating conceptual operating steps for the autonomous memory checker 10 of FIG. 1. During the boot-time after reset, the autonomous memory checker 10 receives a signal to enter the initial memory reference mode 110 from the host. In the initial memory reference mode 110, autonomous memory checker 10 fetches specified contents from memory via the DMA controller 15 and generates 115 memory reference values through an authentication engine 20 for desired memory locations or blocks. Typical authentication schemes include, but are not limited to, secure hash algorithm 1 (SHA-1) and message digest algorithm 5 (MD5). The memory reference value represents a distinct value for specific memory contents. Each memory reference value is stored 117 in the memory reference file 40 for later comparison. The processes 115 and 117 are repeated until the autonomous memory checker 10 receives another signal from the host to enter a runtime check mode 120.

In runtime check mode 120, an adjustable time randomizer initiates memory reference comparison 130. When timer module 35 wakes up the rest of the circuitry in autonomous memory checker 10, controller 25 signals DMA controller 15 to fetch memory contents from specified blocks and addresses. The fetched memory contents are fed into the authentication engine 20 to generate a runtime reference value. The runtime reference value is compared 140 with the stored value in memory reference file 40. The compared runtime and memory reference values correspond to identical memory blocks and addresses. If the runtime and memory reference values match, then processes 130 and 140 are repeated whenever the adjustable time randomizer initiates another memory reference comparison. If the memory reference values do not match 150, then autonomous memory checker 10 enters an error mode 155 and hardware actions are taken.

Once an error occurs, autonomous memory checker 10 has several hardware actions that can be taken. One possible action is entering a hardwired, reduced system state. This wire would bring the functionality of the system to a non-secure state such as E-911 for cellular phones. An external alert is another method of a hardware action for informing error. This could be something as simple as an LED indicating that the integrity of memory content of the device cannot be trusted. For extremely sensitive data, the hardware actions can also include automatic clearing of memory containing sensitive information.

Figure 3:
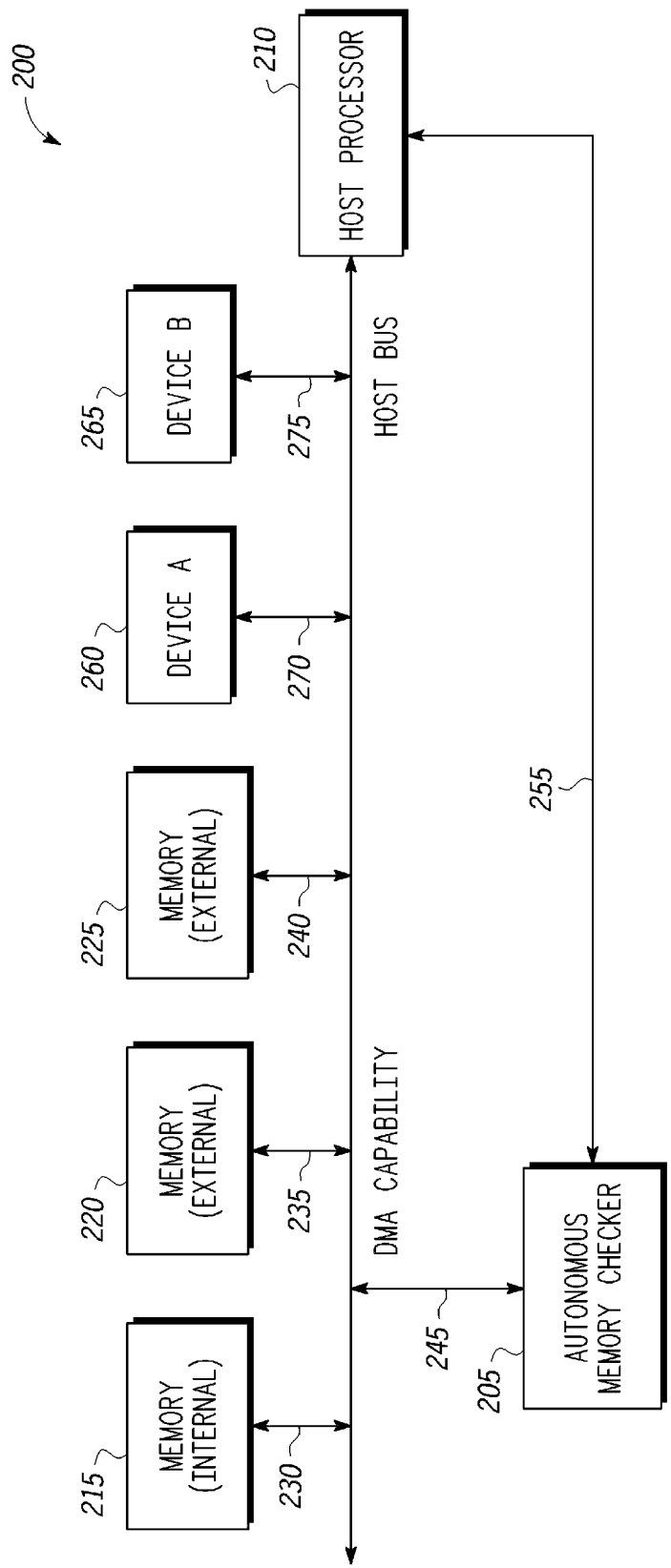
FIG. 3 is a system block diagram showing an autonomous integrity checker coupled to a host processor and memory blocks.

FIG. 3 is a system block diagram 200 showing an autonomous memory checker 205 coupled to a host processor 210. Autonomous memory checker 205 has a master bus 245 which is used to read data from an internal memory block 215 and external memory blocks 220 and 225. Autonomous memory checker 205 is programmed by the host processor 210 over slave bus 255. Autonomous memory checker 205 has a DMA capability and does not require any actions from host processor 210 once it has been programmed. If the write-read checks are implemented, autonomous memory checker 205 should also be able to write to memory blocks 215, 220, and 225.

Autonomous memory checker 205 also has the capability to monitor contents of registers in peripheral devices 260 and 265. During the boot time, autonomous memory checker 205 can authenticate contents of device registers and store register reference values in its memory reference file 40. Then, autonomous memory checker 205 can compare real-time register values in devices 260 and 265 with its stored values during runtime.

Figure 4:
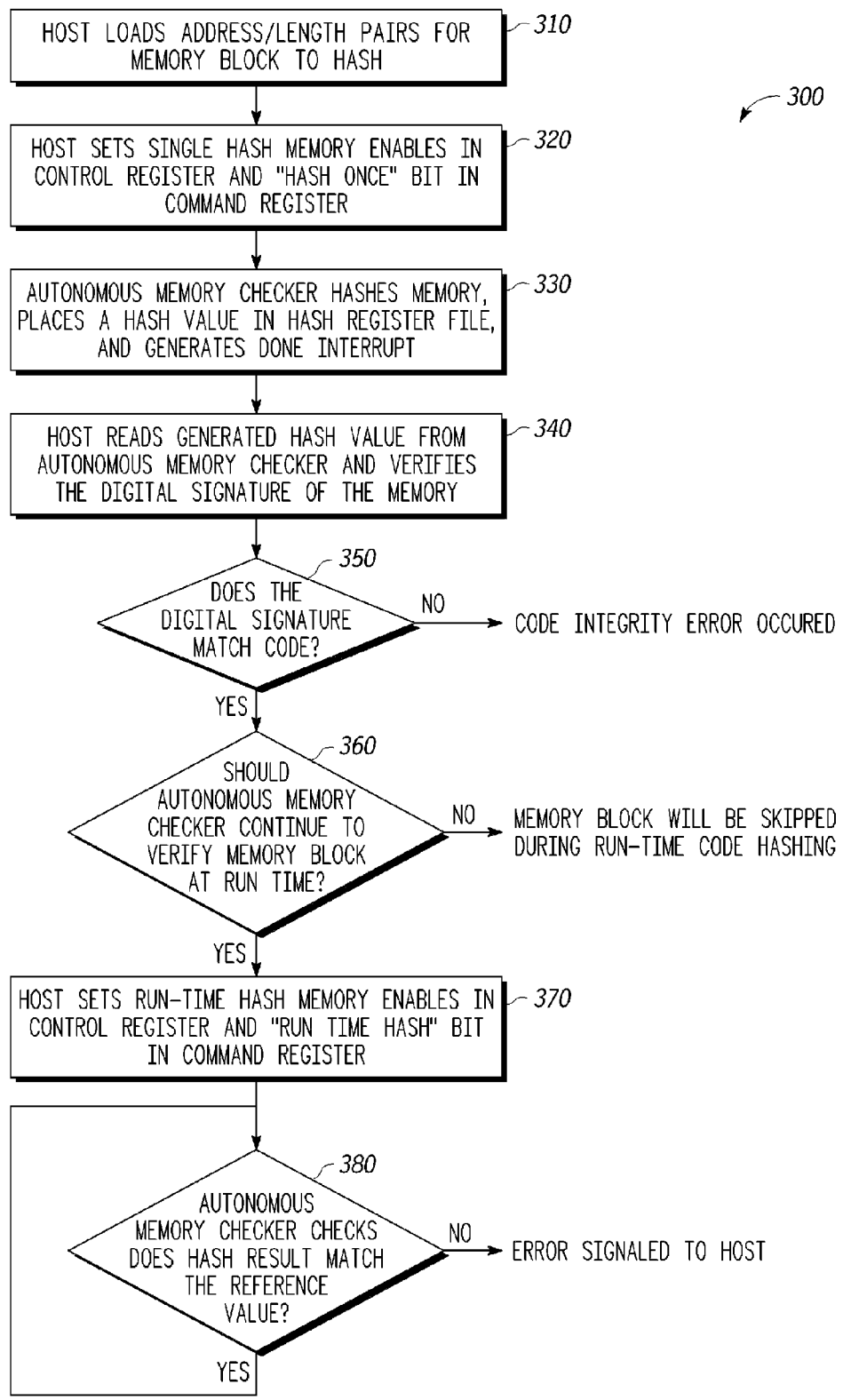
FIG. 4 is a second flow chart illustrating operating steps of an autonomous memory checker for runtime security assurance in accordance with one embodiment of the present invention.

FIG. 4 is a second flow chart 300 displaying operating steps of autonomous memory checker 205. In an embodiment of the system, autonomous memory checker 205 is implemented with a block-check scheme, using hash functions to generate memory reference values. First, host processor 210 loads address and length pairs for memory blocks that need to be hashed, as shown in a procedure box 310. Host processor 210 then sets single hash memory enables in control register and "hash once" bit in command register, as shown in a procedure box 320.

At this stage, autonomous memory checker 205 enters the initial memory reference mode, as previously explained in FIG. 2. Autonomous memory checker 205 hashes memory, places a hash value in the hash register file, and generates "done" interrupt, as shown in a procedure box 330. Then, host processor 210 reads generated hash value from the autonomous memory checker 205 and verifies the digital signature of the memory, as shown in the procedure box 340. If the digital signature is incorrect, then there is a code integrity error, as shown in a decision box 350. If the values match, host processor 210 tells autonomous memory checker 205 whether a memory block comparison should be active during runtime, as shown in a decision box 360. Otherwise, memory block comparison will be skipped during runtime code hashing as indicated in the NO decision of box 360. If host processor 210 wants autonomous memory checker 205 to proceed with block comparisons, host processor 210 will set runtime hash memory enables in the control register and "Run Time Hash" bit in the command register, as shown in a procedure 370.

At this point, autonomous memory checker 205 cannot be turned off and operates independent of commands from the host processor 210. Autonomous memory checker 205 frequently compares hash results from memory blocks 215, 220, and 225 during runtime with stored values in the hash register file. The device operates in an infinite loop 380 until a memory reference mismatch occurs. The check is performed periodically or randomly. A random approach makes an attack such as a piggy back attack where a memory or memory content is swapped out more difficult because the checks do not occur in any regular timed sequence.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic device including an autonomous memory checker for runtime security assurance, the electronic device comprising:

a controller adapted to fetch first memory content from a portion of memory, wherein the first memory content includes software executable on the electronic device;

a memory reference file coupled to said controller, and adapted to store at least one memory reference value that corresponds to the first memory content; and an authentication engine coupled to said controller, and adapted to perform a runtime check during runtime operation of the electronic device by comparing a at least one runtime reference value with the at least one memory reference value, wherein the at least one runtime reference value corresponds to second memory content fetched from the portion of memory during the runtime operation of the electronic device.

2. The electronic device as recited in claim 1 wherein said check is performed periodically during runtime operation of the electronic device.

3. The electronic device as recited in claim 1 wherein said check is performed at random times during runtime operation of the electronic device.

4. The electronic device as recited in claim 1 further including a clock control block coupled to said authentication engine, said memory reference file, and said controller.

5. The electronic device as recited in claim 4 further including a direct memory access (DMA) controller coupled to said authentication engine and said controller.

6. The electronic device as recited in claim 5 further including a timing module coupled to said controller.

7. The electronic device as recited in claim 1 wherein said memory content includes trusted information stored in the memory, and wherein said memory reference value is generated corresponding to the trusted information stored in the memory.

8. The electronic device as recited in claim 7 wherein said trusted information stored in memory is processed by said authentication engine to generate said memory reference value.

9. The electronic device as recited in claim 8, wherein said information stored in memory is processed by said authentication engine to generate said runtime reference value, and wherein said information stored in memory has not been modified if said memory reference value is identical to said runtime reference value.

10. The electronic device as recited in claim 1, wherein the controller is a bus master that is allowed to fetch the memory content from memory without requesting permission.

11. A method of operating an electronic device for runtime security assurance comprising the steps of:
  storing trusted information in specific memory locations within a memory of the electronic device, wherein the trusted information includes software executable on the electronic device;
  fetching said trusted information from the specific memory locations, and providing said trusted information to an authentication engine;
  generating a memory reference value corresponding to said trusted information fetched from the specific memory locations;
  storing said memory reference value in a memory reference file;
  operating the electronic device in a runtime mode of operation;
  fetching memory content from the specific memory locations, and providing the memory content corresponding to the specific memory locations to said authentication engine during the runtime mode of operation of the electronic device;
  generating a runtime reference value from the memory content fetched from the specific memory locations; and
  comparing said runtime reference value to said memory reference value.

12. The method as recited in claim 11 wherein said step of generating a memory reference value corresponding to said trusted information further includes a step of generating said reference value with a hardware authentication engine.

13. The method as recited in claim 11 further including the steps of:
  continuing the runtime mode of operation of the electronic device when said runtime reference value is identical to said memory reference value; and
  signaling an error when said runtime reference value is not identical to said memory reference value.

14. The method as recited in claim 13 further including a step of repeating a runtime check process comprising the steps of again fetching memory content from the specific memory locations, generating a another runtime reference value from memory content, and comparing said another runtime reference value to said memory reference value.

15. The method as recited in claim 14 further including a step of running said runtime check process in a background of the runtime mode of operation of the electronic device.

16. The method as recited in claim 15 further including a step of randomizing when said runtime check process occurs during the runtime mode operation of the electronic device.

17. A method of operating an electronic device for runtime security assurance comprising the steps of:
  fetching trusted information from a portion of memory of the electronic device, wherein the trusted information includes software executable on the electronic device;
  providing the trusted information to an autonomous memory checker during a boot-time mode of operation of the electronic device;
  instructing said autonomous memory checker to hash said trusted information during said boot-time mode;
  generating, by said autonomous memory checker, reference hash values from said trusted information;
  storing said reference hash values to a memory reference file;
  fetching, during a runtime mode of operation of the electronic device, memory contents from the portion of memory from which said trusted information was previously fetched;
  generating, by said autonomous memory checker, runtime hash values with said memory contents retrieved during the runtime mode;
  comparing said reference hash values to said runtime hash values; and
  signaling an error when said reference hash values differ from said runtime hash values to indicate that said trusted information has been modified.

18. The method as recited in claim 17 further including a step of repeating randomly the steps of:
  fetching, during the runtime mode, the memory contents from the portion of memory from which said trusted information was previously fetched;
  generating, by said autonomous memory checker, the runtime hash values with said memory contents retrieved during the runtime mode;
  comparing said reference hash values to said runtime hash values; and
  signaling the error when said reference hash values differ from said runtime hash values to indicate that said trusted information has been modified.

19. The method as recited in claim 17 wherein said step of fetching the trusted information from the portion of memory includes a step of fetching said trusted information from a plurality of memory blocks.

20. The method as recited in claim 19 further including a step of continuing runtime operation of the electronic device when said runtime hash values are identical to said reference hash values.

* * * * *